US005276990A

United States Patent [19]
Ramirez

[11] Patent Number: 5,276,990
[45] Date of Patent: Jan. 11, 1994

[54] ILLUMINATED FISHING POLE

[76] Inventor: John E. Ramirez, 830 Caribou Ter., Brentwood, Calif. 94513

[21] Appl. No.: 20,636

[22] Filed: Feb. 22, 1993

[51] Int. Cl.$^5$ .............................................. A01K 97/12
[52] U.S. Cl. .................................................... 43/17.5
[58] Field of Search ...................... 43/17.5, 18.1, 18.5

[56] References Cited
U.S. PATENT DOCUMENTS

| | | | |
|---|---|---|---|
| 2,805,508 | 9/1957 | Oldfield | 43/17.5 |
| 3,862,509 | 1/1975 | Petersen | 43/17.5 |
| 4,026,059 | 5/1977 | Ochs | 43/17.5 |
| 4,085,437 | 4/1978 | Hrdlicka | 43/17.5 |
| 4,117,618 | 10/1978 | Utsler | 43/17.5 |
| 5,172,508 | 12/1992 | Schmidt | 43/17.5 |
| 5,182,873 | 2/1993 | Aragon | 43/17.5 |

Primary Examiner—Kurt C. Rowan
Attorney, Agent, or Firm—Michael I. Kroll

[57] ABSTRACT

An illuminated fishing pole is provided, which consists of an elongated tubular tapered transparent rod. A handle is attached to a back end of the rod. A mechanism for producing illumination is carried within the handle. A structure is for transmitting the illumination from the illumination producing mechanism through the rod to approximate a front tip end. A fisherman will have an advantage of seeing the front tip end of the rod illuminated while fishing at night.

2 Claims, 2 Drawing Sheets

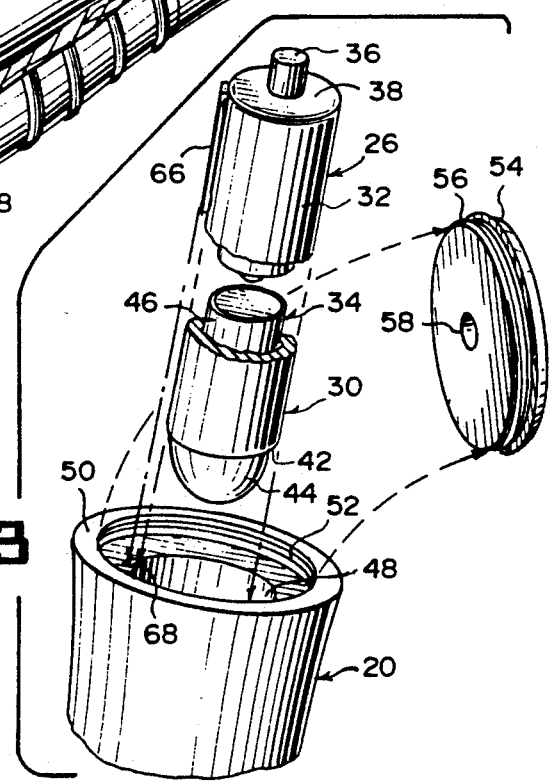
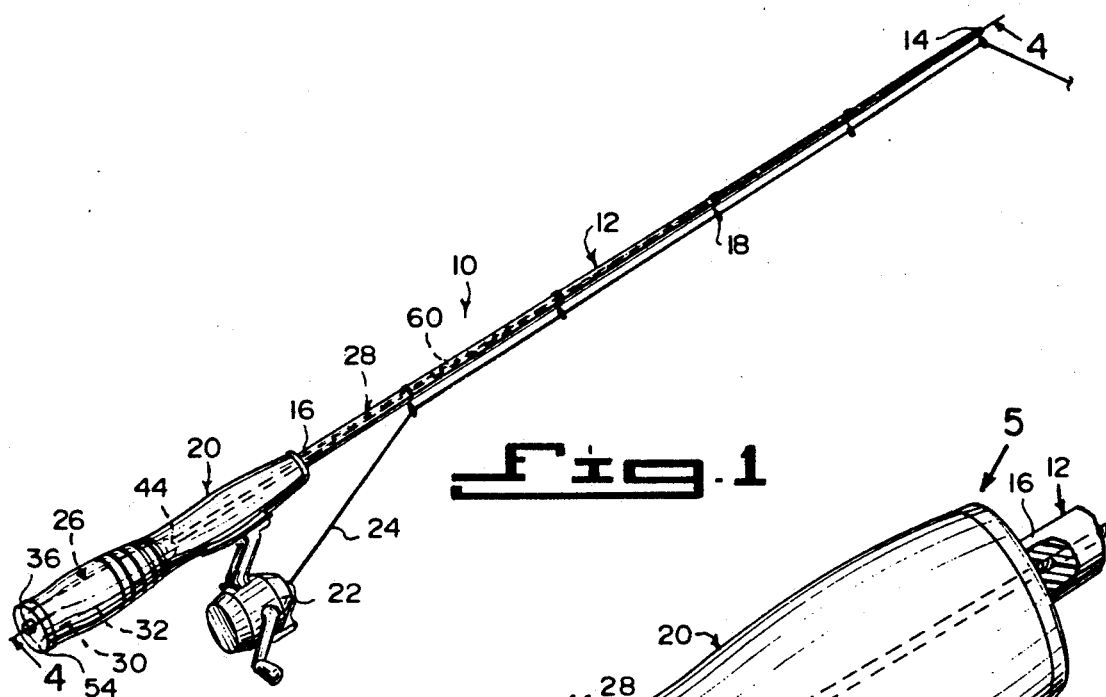
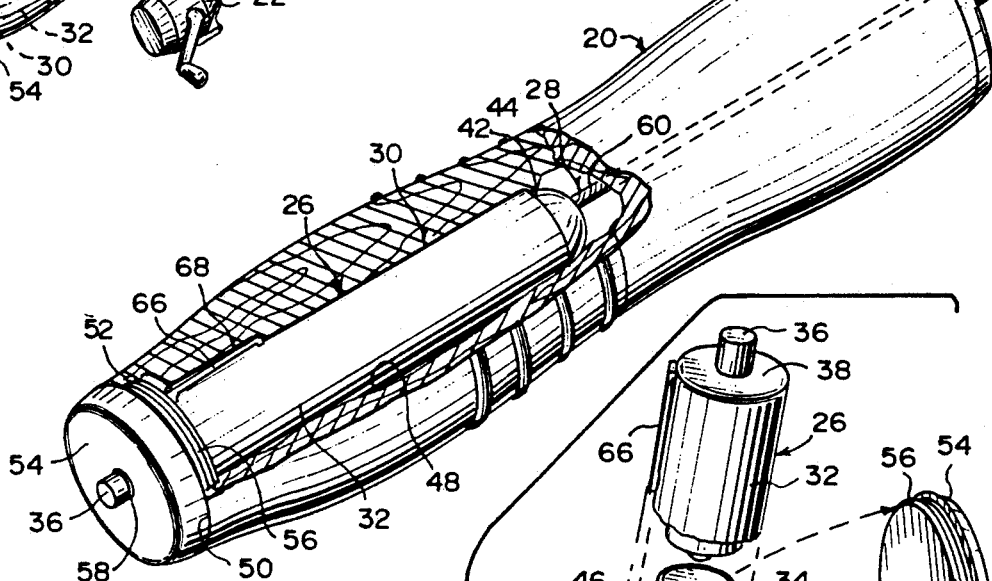
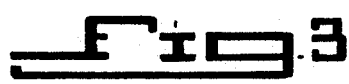

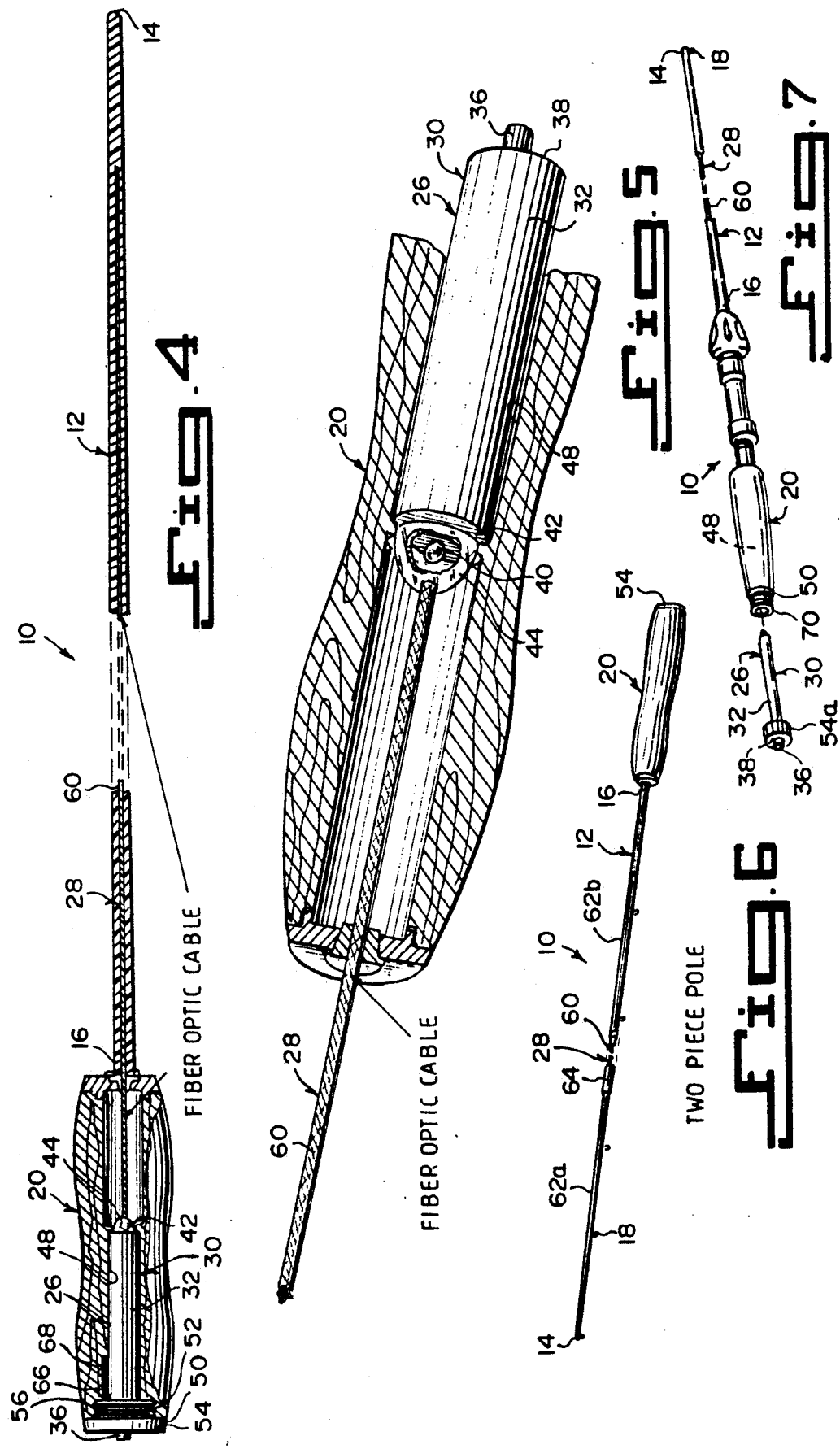

ILLUMINATED FISHING POLE

BACKGROUND OF THE INVENTION

1. Field of the Invention

The instant invention is the subject matter of Disclosure Document No.: 312704, filed in the PTO, and it is respectfully requested that this document be retained beyond the two-year period, so that it may be relied upon as evidence of conception of the invention during the prosecution phase of this application, should the need arise.

The instant invention relates generally to fishing tackle and more specifically it relates to an illuminated fishing pole.

2. Description of the Prior Art

Numerous fishing tackle have been provided in prior art that are adapted to contain light producing mechanisms built therein to be utilized by fishermen. While these units may be suitable for the particular purpose to which they address, they would not be as suitable for the purposes of the present invention as heretofore described.

SUMMARY OF THE INVENTION

A primary object of the present invention is to provide an illuminated fishing pole that will overcome the shortcomings of the prior art devices.

Another object is to provide an illuminated fishing pole that has an illumination producing mechanism removably retained in its handle, so that a front tip end of a fishing rod can be illuminated therefrom.

An additional object is to provide an illuminated fishing pole that will allow a fisherman an advantage of seeing the front tip end of the fishing rod illuminated while fishing at night.

A further object is to provide an illuminated fishing pole that is simple and easy to use.

A still further object is to provide an illuminated fishing pole that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention.

FIG. 2 is an enlarged perspective view with parts broken away and in section of the handle with the penlite flashlight therein.

FIG. 3 is an exploded perspective view with parts broken away of the back end of the handle with the penlite flashlight removed therefrom.

FIG. 4 is a cross sectional view taken along line 4—4 in FIG. 1.

FIG. 5 is a perspective view taken in direction of arrow 5 in FIG. 2 with parts broken away and in section.

FIG. 6 is a perspective view of a first modification of a two piece pole configuration.

FIG. 7 is a perspective view of a second modification showing the end cap as part of the penlite flashlight.

DETAILED DESCRIPTION OF THE PREFERRED EMBODIMENTS

Turning now descriptively to the drawings, in which similar reference characters denote similar elements throughout the several views, FIGS. 1 through 5 illustrate an illuminated fishing pole 10, which consists of an elongated tubular tapered transparent rod 12 having a front tip end 14 and a back end 16. A plurality of guides 18 are spaced between the front tip end 14 and the back end 16 of the rod 12, while a handle 20 is attached to the back end 16 of the rod 12. A fishing reel 22 is mounted to the handle, with a fishing line 24 extending from the fishing reel 22 and through the guides 18. a mechanism 26 for producing illumination is carried within the handle 20. A structure 28 is for transmitting the illumination from the illumination producing mechanism 26, through the rod 12 to approximate the front tip end 14 of the rod 12. A fisherman will have an advantage of seeing the front tip end 14 of the rod 12 illuminated while fishing at night.

The illumination producing mechanism 26 is a flashlight 30, of a penlite type which includes a cylindrical housing 32 with a power source 34 within the housing 32. A push button switch 36 is at a rearward end 38 of the housing 32. A light bulb 40 is at a forward end 42 of the housing 32. A lens 44 is over the light bulb 40 at the forward end 42 of the housing 32. The power source 34 is at least one battery 46.

The handle 20 has an axially elongated cylindrically shaped compartment 48 extending from a back end 50 therefrom, so as to receive the cylindrical housing 32 of the penlite type flashlight 30 therein. The handle 20 also has an internally threaded counter bore 52 at the back end 50 thereof and is formed integrally with the compartment 48. An end cap 54 has an externally threaded cylindrical body portion 56 of a reduced diameter and a central aperture 58 therethrough. The cylindrical body portion 56 can be threaded into the counter bore 52, to retain the penlite type flashlight 30 within the compartment 48 with the push button 36 extending through the central aperture 58 in the end cap 54.

The illumination transmitting structure 28 is an elongated fiber optic cable 60 and is of a length to extend from the lens 44 of the penlite type flashlight 30 within the compartment 48 in the handle 20 through the center of the rod 12 to approximate the front tip end 14, so as to transmit the light from the light bulb 40 to the front tip end 14 thereof. The elongated fiber optic cable 60 is an assembly of optical fibers forming a bundle of transparent threads, each of which transmits the light from the light bulb 40. The rod 12 is fabricated out of fiber glass material 62 to permit the light to pass freely therethrough.

As shown in FIG. 6, the rod 12 with the fiber optic cable 60 therein can be segmented into at least two sections 62, 62b, with the forward section 62a having a ferrule end 64, so that the sections 62a, 62b can be assembled together for use and disassembled for storage.

As shown in FIGS. 2, 3 and 4, the cylindrical housing 32 has a clip 66 thereon. The compartment 48 within the handle 20 has a longitudinal keyway 68, so as to receive the cylindrical housing 32 with the clip 66 of the penlite type flashlight 30 therein.

The handle 20, shown in FIG. 7, also has the cylindrically shaped compartment 48 extending from the back end 50 therefrom, so as to receive the cylindrical housing 32 of the penlite type flashlight 30 therein. The handle 20 now has an externally threaded collar 70 at the back end thereof 50 and is formed integrally with the compartment 48. The end cap 54a is internally threaded and is formed integrally about a back end 38 of the cylindrical housing 32, so that the end cap 54a can be threaded onto the collar 70 to retain the penlite type flashlight 30 within the compartment 48.

LIST OF REFERENCE NUMBERS 10 illuminated fishing pole
12 transparent rod
14 front tip end of 12
16 back end of 12
18 guide on 12
20 handle
22 fishing reel
24 fishing line
26 illumination producing mechanism
28 illumination transmitting structure
30 penlite type flashlight for 26
32 cylindrical housing
34 power source in 32
36 push button switch
38 rearward end of 32
40 light bulb
42 forward end of 32
44 lens
46 battery for 34
48 compartment in 20
50 back end of 20
52 internally threaded counter bore
54 end cap
54a
modified end cap
56 externally threaded body portion of 54
58 central aperture in 54
60 fiber optic cable for 28
62a first section of 12
62b second section of 12
64 ferrule end on 62a
66 clip on 32
68 keyway in 48
70 externally threaded collar It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An illuminated fishing pole which comprises:
   a) an elongated tubular tapered transparent rod, having a front tip end and a back end;
   b) a plurality of guides spaced between the front tip end and the back end of said rod;
   c) a handle attached to the back end of said rod;
   d) a fishing reel mounted to said handle;
   e) fishing line extending from said fishing reel through said guides;
   f) means for producing illumination carried within said handle; and
   g) means for transmitting the illumination from said illumination producing means through said rod to approximate the front tip end of said rod, so that a fisherman will have an advantage of seeing the front tip end of said rod illuminated while fishing at night,
   wherein said illumination producing means is a flashlight, wherein said flashlight is of a penlite type which includes:
   a) a cylindrical housing;
   b) a power source within said housing;
   c) a push button switch at a rearward end of said housing;
   d) a light bulb at a forward end of said housing; and
   e) a lens over said light bulb at the forward end of said housing,
   wherein said power source is at least one battery, wherein
   a) said handle having an axially elongated cylindrically shaped compartment extending from a back end therefrom, so as to receive said cylindrical housing of said penlite type flashlight therein;
   b) said handle having an internally threaded counter bore at the back end thereof and formed integrally with said compartment; and
   c) an end cap having an externally threaded cylindrical body portion of a reduced diameter and a central aperture therethrough, so that said cylindrical body portion can be threaded into said counter bore to retain said penlite type flashlight within said compartment with said push button extending through said central aperture in said one cap,
   wherein said illumination transmitting means is an elongated fiber optic cable,
   wherein siad elongated fiber optic cable is of a length to extend from said lens of said penlite type flashlight within said compartment in said handle through the center of said rod to approximate the front tip end, so as to transmit the light from said light bulb to the front tip end thereof,
   wherein said elongated fiber optic cable is an assembly of optical fibers forming a bundle of transparent threads, each of which transmits the light from said light bulb,
   wherein said rod is fabricated out of fiber glass material to permit the light to pass freely therethrough; wherein
   a) said cylindrical housing having a clip thereon;
   b) said compartment within said handle having a longitudinal keyway, so as to receive said cylindrical housing with said clip of said penlite type flashlight therein.

2. An illuminated fishing pole as recited in claim 1, further including:
   a) said handle having an axially elongated cylindrically shaped compartment extending from a back end therefrom, so as to receive said cylindrical housing of said penlite type flashlight therein;

b) said handle having an externally threaded collar at a back end thereof and formed integrally with said compartment; and
c) an end cap internally threaded and formed integrally about a back end of said cylindrical housing, so that said end cap can be threaded onto said collar to retain said penlite type flashlight within said compartment.

* * * * *